United States Patent
Swamy et al.

(10) Patent No.: US 11,430,002 B2
(45) Date of Patent: Aug. 30, 2022

(54) SYSTEM AND METHOD USING DEEP LEARNING MACHINE VISION TO CONDUCT COMPARATIVE CAMPAIGN ANALYSES

(71) Applicant: Dell Products L.P., Round Rock, TX (US)

(72) Inventors: Arun Swamy, Bangalore (IN); Ravi Shukla, Bangalore (IN); Prakash Sridharan, Bangalore (IN); Sumant Sahoo, Bangalore (IN); Ramakanth Kanagovi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 117 days.

(21) Appl. No.: 16/741,955

(22) Filed: Jan. 14, 2020

(65) Prior Publication Data
US 2021/0217051 A1    Jul. 15, 2021

(51) Int. Cl.
| | |
|---|---|
| *G06Q 30/02* | (2012.01) |
| *G06F 16/28* | (2019.01) |
| *G08G 1/00* | (2006.01) |
| *G06N 3/08* | (2006.01) |
| *G06Q 40/06* | (2012.01) |

(52) U.S. Cl.
CPC ....... *G06Q 30/0243* (2013.01); *G06F 16/288* (2019.01); *G06N 3/08* (2013.01); *G06Q 30/0266* (2013.01); *G06Q 40/06* (2013.01); *G08G 1/20* (2013.01)

(58) Field of Classification Search
CPC ................ G06Q 30/0243; G06Q 30/0266
See application file for complete search history.

(56) References Cited

U.S. PATENT DOCUMENTS

| | | | |
|---|---|---|---|
| 10,621,203 B2 * | 4/2020 | Hunt | G06F 16/283 |
| 2011/0145039 A1 * | 6/2011 | McCamey | G06Q 30/0261 |
| | | | 705/7.32 |

(Continued)

OTHER PUBLICATIONS

Benjamin Letham et al., Sequential event prediction, Machine Learning 93:357-380, 2013 http://lethalletham.com/Letham_SEP_final.pdf.

(Continued)

*Primary Examiner* — Azam A Ansari
(74) *Attorney, Agent, or Firm* — Terrile, Cannatti & Chambers; Stephen A. Terrile

(57) ABSTRACT

At least one embodiment of the disclosed system is directed to computer-implemented method for using machine vision to categorize a locality to conduct lead mining analyses. Embodiments of the method may include: generating locality profile scores and economic categorization for each locality of a plurality of localities, the locality profile score for each locality being derived through neural network analyses of map images of the locality, the economic categorization being derived through neural network analyses of images of entities within the locality; and generating a lead score for each entity in the locality group as a function of the locality profile score for the locality in which the entity is located, the economic categorization of the locality in which the entity is located, and campaign vehicles used in the locality in which the entity is located.

14 Claims, 15 Drawing Sheets

(56) References Cited

U.S. PATENT DOCUMENTS

2012/0150627 A1* 6/2012 Hicken .............. G06Q 30/0241
                                                    705/14.42
2017/0109615 A1* 4/2017 Yatziv ................. G06F 16/5866
2017/0278289 A1* 9/2017 Marino ................... G06T 11/60

OTHER PUBLICATIONS

Yanpeng Zhao et al., Sequence Prediction Using Neural Network Classifiers, JMLR: Workshop and Conference Proceedings 57:164,169, The Sequence Predictlction ChallengE (SPiCe), 2016 http://proceedings.mlr.press/v57/zhao16.pdf.

* cited by examiner

| ACCOUNT IDENTIFIER | Account 1 | Account 2 |
|---|---|---|
| Entity Class 1 Score (e.g., Educational institutions) | 10% | 20% |
| Entity Class 2 Score (e.g., IT Parks ) | 5% | 8% |
| Entity Class 3 Score (e.g., Restaurants) | 45% | 55% |
| Entity Class 4 Score (e.g., Manufacturing) | 10% | 8% |
| Economic classification (e.g., percentage score and/or High/Medium/Low) | 30% | 28% |
| Dominant Entity Class | Restaurant | Manufacturing |
| Campaign Localities | Localities G1, G2, G3 | Locallity H2 |
| Campaign Vehicle | Event | Elecrtronic Marketing |
| Locality Leads | 200 | 200 |
| Locality Conversion | 20% | 20% |
| No. of employees | 500 | 500 |
| IT spending | $500M | $500M |
| Lead converted / Not Converted | 0 | 1 |
| Lead Score | 18 | 24 |
| Historical ROI | $30,000 | $50, 000 |
| Lead Quotient | $540,000 | $1,200,000 |
| n tile Lead Quotient | 870000 | 1167000 |

| ACCOUNT IDENTIFIER | Account 1 - campaign 1 | Account 1 - Campaign 2 |
|---|---|---|
| Entity Class 1 Score (e.g., Educational institutions) | 10% | 10% |
| Entity Class 2 Score (e.g., IT Parks) | 5% | 5% |
| Entity Class 3 Score (e.g., Restaurants) | 45% | 45% |
| Entity Class 4 Score (e.g., Manufacturing) | 10% | 10% |
| Economic classification (e.g., numerical score and/or High/Medium/Low) | 30% | 30% |
| Dominant Entity Class | Restaurant | Restaurant |
| Campaign Localities | Locality G1, Locality G2 | Locality G1, Locallity G2 |
| Campaign Vehicle | Web conference | Elecrtronic Marketing |
| Locality Leads | 200 | 150 |
| Locality Conversion | 30% | 20% |
| No. of employees | 500 | 500 |
| IT spending | $500M | $500M |
| Lead converted / Not Converted | 1 | 0 |
| Lead Score | 15 | 7 |
| Historical ROI | $100,000 | $100,000 |
| Lead Quotient | $1,500,000 | $700,000 |
| n tile Lead Quotient | 1M | 1M |

FIG. 14

SYSTEM AND METHOD USING DEEP LEARNING MACHINE VISION TO CONDUCT COMPARATIVE CAMPAIGN ANALYSES

BACKGROUND OF THE INVENTION

Field of the Disclosure

The present disclosure relates to information handling systems. More specifically, embodiments of the disclosure relate to a system and method using deep learning machine vision to categorize localities to conduct comparative campaign analyses.

Description of the Related Art

As the value and use of information continues to increase, individuals and businesses seek additional ways to process and store information. Options available to users include information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as customer record management, business projection analysis, etc. In addition, information handling systems may include a variety of hardware and software components that are configured to process, store, and communicate information and may include one or more computer systems, data storage systems, and networking systems.

SUMMARY

A system of one or more computers can be configured to perform particular operations or actions by virtue of having software, firmware, hardware, or a combination of them installed on the system that in operation causes or cause the system to execute deep learning machine vision to conduct comparative campaign analyses. At least one embodiment is directed to generating locality profile scores and economic categorizations for each locality of a plurality of localities, wherein the locality profile score includes percentage distributions of entity classes within the locality, the locality profile score for each locality being derived through neural network analyses of map images of the locality, the economic categorization being derived through neural network analyses of images of entities within the locality; grouping localities having similar locality profile scores; extracting entities in a locality group; retrieving historical data for the extracted entities in the locality group, wherein the historical data for the entities in the locality includes campaign vehicles hosted in the locality to promote sales of goods and/or services of an enterprise, leads generated by the campaign vehicles in the locality, and return on investment for the campaign vehicles in the locality; and generating a lead score for each entity in the locality group as a function of the locality profile score for the locality in which the entity is located, economic categorization of the locality in which the entity is located, and campaign vehicles used in the locality in which the entity is located. Other embodiments of this aspect include corresponding computer systems, apparatus, and computer programs recorded on one or more computer storage devices, each configured to perform the actions of the methods.

At least one embodiment is directed to a system may include: a processor; a data bus coupled to the processor; and a non-transitory, computer-readable storage medium embodying computer program code, the non-transitory, computer-readable storage medium being coupled to the data bus, the computer program code interacting with a plurality of computer operations and may include instructions executable by the processor and configured for: generating locality profile scores and economic categorizations for each locality of a plurality of localities, wherein the locality profile score includes percentage distributions of entity classes within the locality, the locality profile score for each locality being derived through neural network analyses of map images of the locality, the economic categorization being derived through neural network analyses of images of entities within the locality; grouping localities having similar locality profile scores; extracting entities in a locality group; retrieving historical data for the extracted entities in the locality group, wherein the historical data for the entities in the locality includes campaign vehicles hosted in the locality to promote sales of goods and/or services of an enterprise, leads generated by the campaign vehicles in the locality, and return on investment for the campaign vehicles in the locality; and generating a lead score for each entity in the locality group as a function of the locality profile score for the locality in which the entity is located, economic categorization of the locality in which the entity is located, and campaign vehicles used in the locality in which the entity is located.

At least one embodiment is directed to a non-transitory, computer-readable storage medium embodying computer program code, the computer program code may include computer executable instructions configured for: generating locality profile scores and economic categorizations for each locality of a plurality of localities, wherein the locality profile score includes percentage distributions of entity classes within the locality, the locality profile score for each locality being derived through neural network analyses of map images of the locality, the economic categorization being derived through neural network analyses of images of entities within the locality; grouping localities having similar locality profile scores; extracting entities in a locality group; retrieving historical data for the extracted entities in the locality group, wherein the historical data for the entities in the locality includes campaign vehicles hosted in the locality to promote sales of goods and/or services of an enterprise, leads generated by the campaign vehicles in the locality, and return on investment for the campaign vehicles in the locality; and generating a lead score for each entity in the locality group as a function of the locality profile score for the locality in which the entity is located, economic categorization of the locality in which the entity is located, and campaign vehicles used in the locality in which the entity is located.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

FIG. 13 is a table showing one example of a comparison between two entity accounts, where each account is analyzed to determine whether a given campaign vehicle is likely to be effective in obtaining and converting leads.

FIG. 14 depicts a table showing a comparison of the likelihood of the effectiveness of two different campaign vehicles on a single entity account.

DETAILED DESCRIPTION

Figure 1:
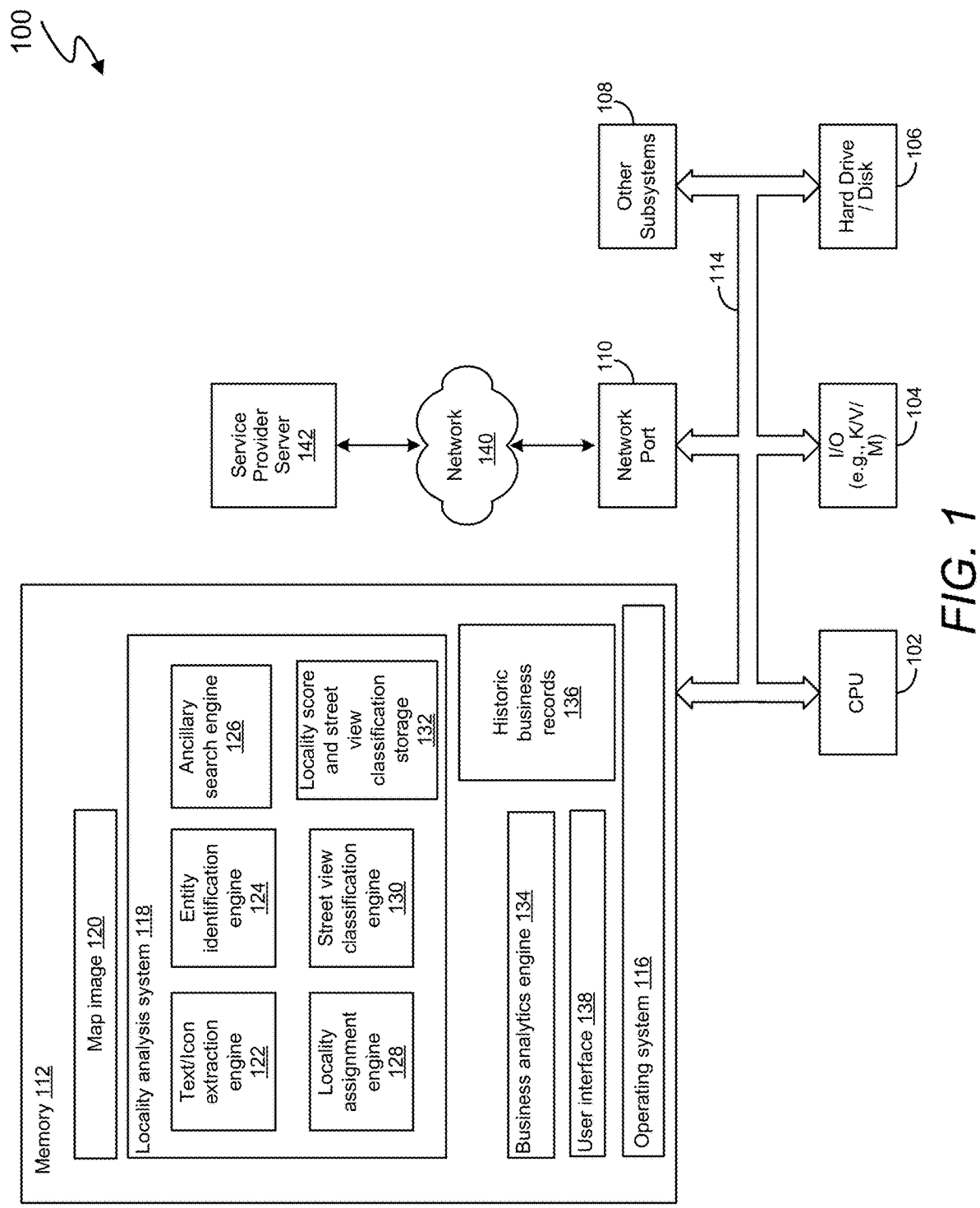
FIG. 1 is a generalized illustration of an information handling system that is configured to implement certain embodiments of the system and method of the present disclosure.

Systems and methods are disclosed for employing deep learning machine vision analysis on geographic artefacts found in map images for various localities in order to collect and interpret customer ecosystem data that translates into meaningful and actionable insights that may be used by an enterprise to increase account retention, induce account spending, identify whitespace accounts, mine leads, and position products for existing greenfield accounts. In certain embodiments, the neural networks are used to identify geographic artifacts (e.g., Text/Icons/Visual Cues) present in a map for a locality. In certain embodiments, the geographic artifacts correspond to entities existing within a boundary of the locality. In certain embodiments, the entities may be assigned different entity types to determine a locality profile score based on the types of entities in the locality. In certain embodiments, street view images associated with the entities within the locality are accessed and provided to a deep learning network to obtain further insights for the entity, locality, and/or economic characterization of the locality/entity. For purposes of the present disclosure, a street view image of an entity includes any image from which an external view of the building or area associated with the entity may be extracted.

Embodiments of the disclosed system recognize that an enterprise often assigns significant resources in the development and execution of campaigns designed to sell products and/or services provided by the enterprise. Enterprises currently receive many of enterprise's leads through feedback provided by customers in response to marketing campaigns. Assessing whether a marketing campaign is effective in generating leads is a difficult task, particularly in instances in which the enterprise wishes to direct a marketing campaign to obtain new accounts (e.g., greenfield accounts that are not currently customers of the enterprise).

Embodiments of the disclosed system recognize that the locality scores and economic classifications may be derived from deep learning, machine vision operations on an image map to group entities having similar locality scores. Entities having similar locality scores and economic classifications often generate leads in response to similar marketing campaigns. A comparative analysis between marketing campaigns in different localities may be used in certain embodiments to ensure that an enterprise is effectively using its marketing budget in a manner that is likely to provide lead conversions that result in purchases of products.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that is configured to implement certain embodiments of the system and method of the present disclosure. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is accessible by a service provider server 142. In certain embodiments, a user interacts with the various components and engines of the information handling system 100 through a user interface 138.

The information handling system 100 likewise includes system memory 112, which is interconnected to the foregoing via one or more buses 114. System memory 112 may be local memory, remote memory, memory distributed between multiple information handling systems, etc. System memory 112 further comprises an operating system 116 and in various embodiments may also comprise other software modules and engines configured to implement certain embodiments of the disclosed system.

In the example shown in FIG. 1, memory 112 includes a locality analysis system 118 that is configured to generate a locality profile score for a locality defined by a map image 120 and, in some embodiments, add further classifications to entities in the locality based on images of the buildings or areas associated with the entities may be extracted. The boundaries defining the locality of map image 120 may be entered directly by a user. Additionally, or in the alternative, the boundaries used to define various localities may be based on business sector, business region, product sector, etc. In certain embodiments, the map image 120 may include boundaries for multiple, separate localities that are analyzed as different localities by the locality analysis system 118. In certain embodiments, the map image 120 may be limited to a map image of a single locality that is to be analyzed by the locality analysis system 118.

The exemplary locality analysis system 118 shown in FIG. 1 includes a text/icon extraction engine 122. In at least one embodiment, the text/icon extraction engine 122 includes a convolutional neural network (CNN) that consumes segmented pixel areas (e.g., 15 by 15 pixel areas) of the map image 120 and distinguishes areas containing text and/or icons from areas that do not contain text and/or icons. In at least one embodiment, the text and/or icon pixel areas are used to reconstruct a map image that generally includes only the text and/or icon pixel areas. The same CNN or another CNN of the text/icon extraction engine 122 performs an optical character recognition (OCR) operation on the reconstructed map image. In certain embodiments, the OCR text is provided to an entity identification engine 124, which assists in identifying the type of entity associated with the OCR text. In certain embodiments, the type of entity may be directly derived from the text associated with the entity. As an example, an entity described as "Phoenix Movie Theater" in the OCR text may be properly determined to be a movie theater type entity. In certain embodiments, the type of entity may be derived from an icon associated with the text of the entity. As an example, an entity described as "Phoenix" in the OCR text and having a movie theater icon in close proximity to the text may be properly classified as a movie theater type entity.

In at least one embodiment, OCR text is used to search ancillary sources to identify the entities within the locality. To this end, certain embodiments may include an ancillary search engine 126 that is configured to search external ancillary sources of information associated with the locality using the OCR text to identify the type of entity associated with the OCR text. In some embodiments, the ancillary search engine 126 may include a web browser configured to access ancillary sources such as yellow pages for the locality, tourist guides for the locality, etc. As an example, the OCR text "Phoenix," without more, makes identification of the type of entity that is to be assigned to "Phoenix" difficult. However, in at least one embodiment, the ancillary search engine 126 may search the ancillary sources using the text "Phoenix" and find that there is a movie theater by the name of "Phoenix" in the locality. As such, the entity "Phoenix" is classified as a movie theater type entity. Based on the teachings of the present disclosure, it will be recognized that the foregoing entity type assignment operations may be extended to multiple entity types such as, without limitation, hotels, restaurants, schools, retailers, service operators, etc.

In certain embodiments, the locality is assigned a locality profile score by locality assignment engine 128. At least one embodiment, entities of similar entity types are clustered by the locality assignment engine 128. As an example, text such as "school," "college," "University," etc. may be aggregated with one another in an "education" cluster. As another example, theater entities may be aggregated with one another in a "theater" cluster. In certain embodiments, the text used to identify particular entity types may be clustered using a clustering algorithm like, for example, K-means.

In certain embodiments, the locality profile score corresponds to the percentage that an entity type contributes to the overall entity makeup of the locality. As an example, let x1, x2, x3 . . . xn be the percentage of entities in a text cluster that represents the entire body of entities in the locality. For example, if a locality has 30% schools and 40% theaters, then the locality will have a score of x1=30% school and x2=40% theater. However, in certain embodiments, the entity type xi is only used in the locality profile score if xi is greater than a predetermined threshold (e.g. xi>10%). If all xi are less than 10% the locality may be considered as a mixed locality. In such embodiments, locality profile scores may be assigned to the locality using a percentage based analysis, where a percentage is assigned to each cluster type based on a number of entities included in the cluster type to a total number of clustered entities.

In at least one embodiment, pictorial images, such as street view images, of the identified entities and/or areas proximate to the identified entities may be retrieved from one or more online sources. In at least one embodiment, the street view images are provided to a CNN of a street view classification engine 130 and used to further assign economic classifications to the locality. In at least one embodiment, a CNN trained on a given entity type is used to assign further classifications to an entity of the given entity type based on the street view image of the entity and/or street view images of areas proximate the entity. For example, the street view image of a school in the locality may be provided to a CNN trained on school images from multiple training sources. The CNN may use the street view image of the school to classify the school based on its size (e.g., large, medium, small), based on visual features of the school indicative of income demographics (e.g., high-income, middle-income, low-income), etc. in certain embodiments, the locality profile score and street view classification for the locality and entities within the locality are proper provided to score/classification storage 132. In various embodiments, without limitation, the data in the score/classification storage 132 may be retained directly in local memory, offloaded to external storage, etc.

Certain embodiments of the information handling system 100 include a business analytics engine 134. In certain embodiments, the business analytics engine correlates locality profile scores and street view classifications to accounts existing in historical business records 136 so that the locality profile scores and/or street view classifications may be used by the business analytics engine 134 in targeting marketing campaigns having significant lead generation and return on investment. In certain embodiments, the business analytics engine 134 is configured to group entities having similar locality scores and economic classifications. Entities having similar locality scores and economic classifications often have similar technology needs. The historical data may be obtained for the entities in a group pursuant to executing comparative analysis to identify types of marketing campaigns that are effective for generating and converting leads in the same group. In certain embodiments, the business analytics engine 134 may be used to identify entities that represent greenfield accounts and use third-party data to obtain relevant information for the greenfield account that may be associated with a locality group having similar demographics. Certain embodiments generate a lead score and/or lead quotient for accounts having similar locality profile scores and economic classifications. In certain embodiments, the lead score is a function of the locality score, economic classification for the entities and/or locality, as well as the campaign type. In certain embodiments, the lead score may be multiplied by the historical return on investment of a campaign with for and account. In certain embodiments, the lead quotient may be compared against a threshold value. In certain embodiments, the lead quotient comparison may be used to identify accounts that should be considered in a particular marketing campaign. As an example, only accounts having lead quotients meeting the predetermined threshold value will be targeted using a given marketing campaign. In certain embodiments, the lead quotient comparison may be used to identify the types of campaigns that are effective for one or more accounts. As an example, marketing campaigns may be formulated based on the number of accounts in a locality group that have lead quotients that meet the predetermined threshold value. Other manners of employing the lead quotient may also be employed.

Figure 2:
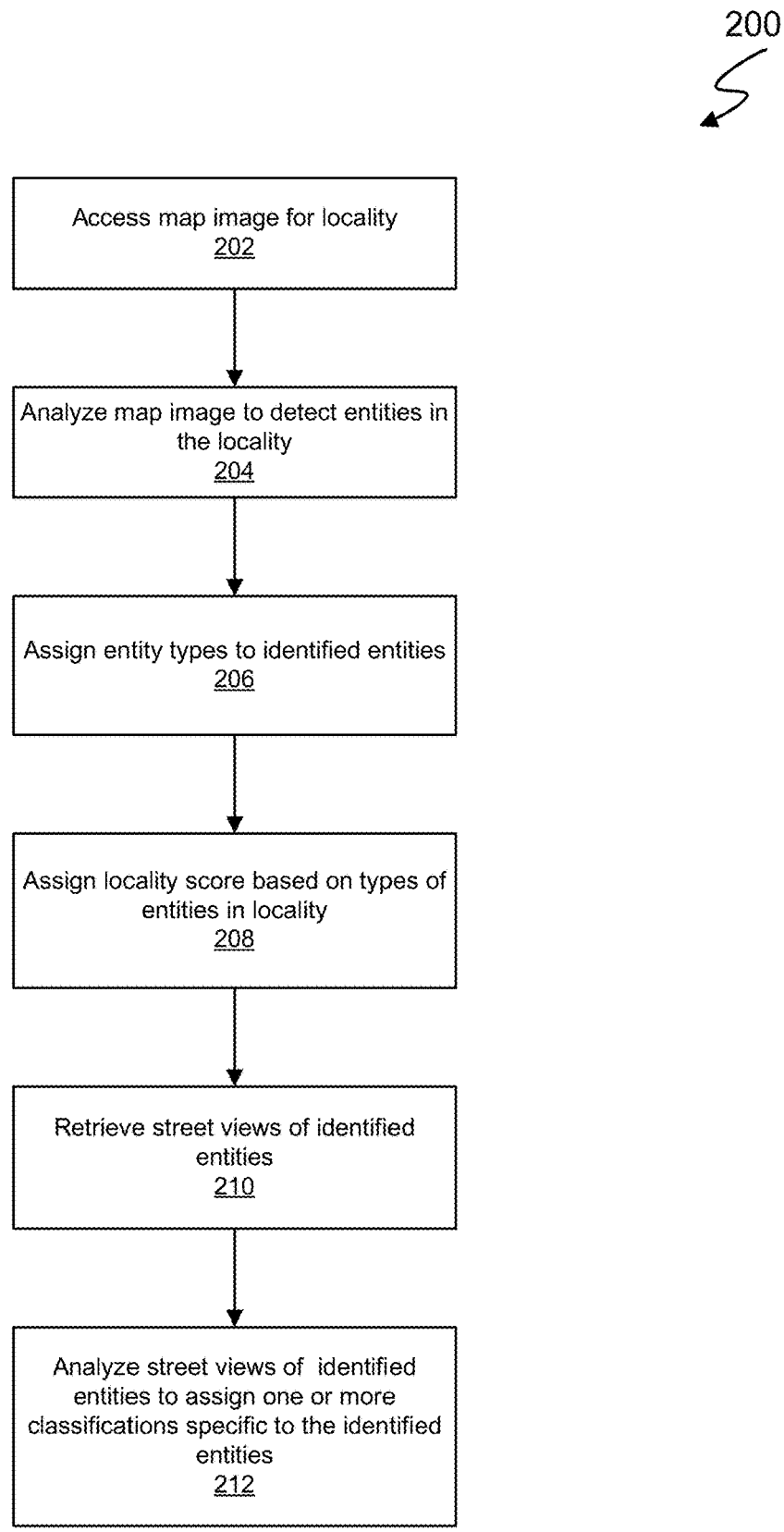
FIG. 2 is a flowchart depicting exemplary operations that may be executed in certain embodiments of the disclosed system.

FIG. 2 is a flowchart 200 depicting exemplary operations that may be executed in certain embodiments of the disclosed system. In this example, a map image for a locality that is to be analyzed is accessed at operation 202. At operation 204, the map image is analyzed to detect entities in the locality. Entity types are assigned to the detected entities at operation 206, and a locality profile score is assigned to the locality at operation 208 based on the types of entities in the locality. In certain embodiments, street views of the detected entities are retrieved at operation 210 and analyzed at operation 212 to assign further classifications to the entities based on the entity images and/or images of areas proximate the entity.

Figure 3:
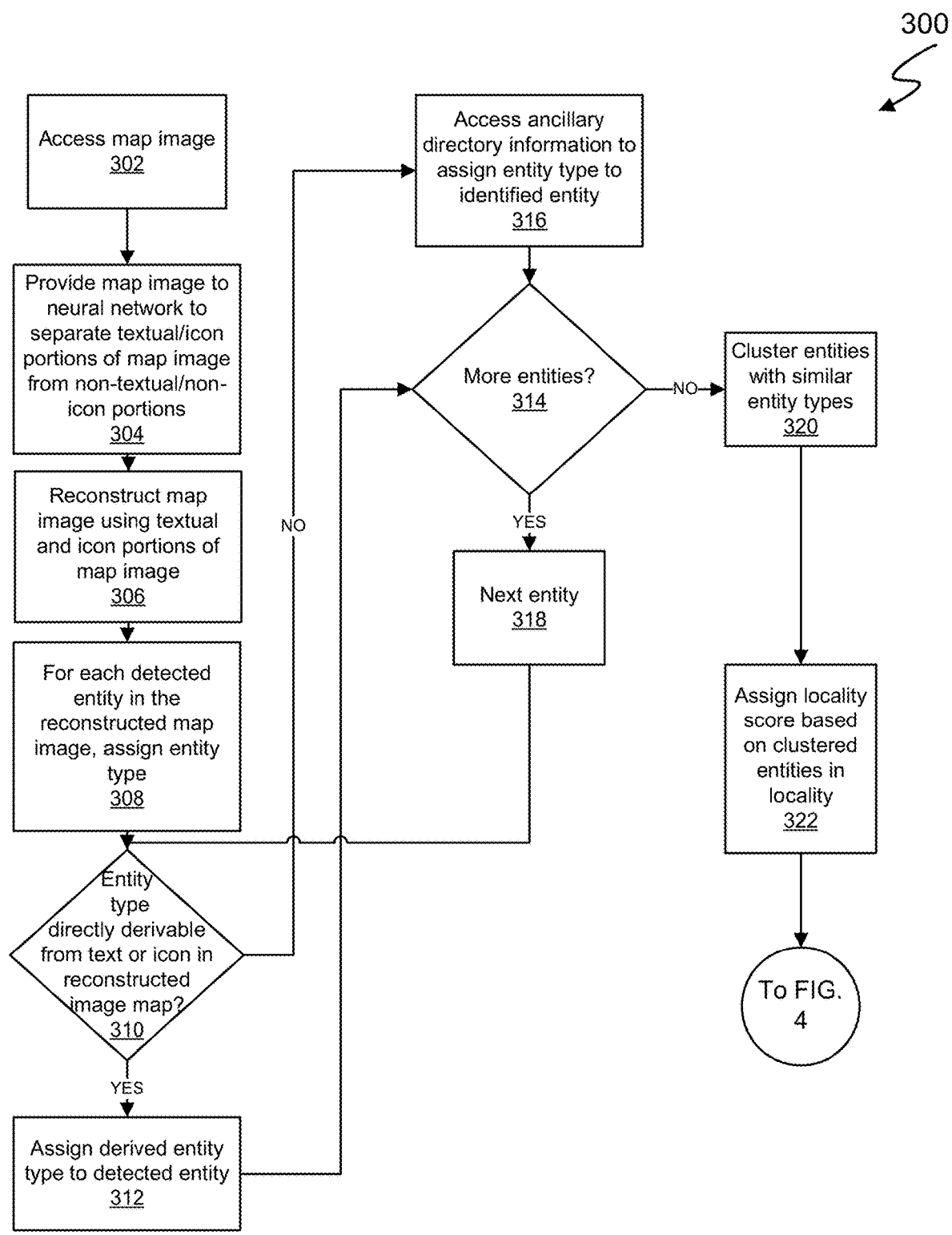
FIG. 3 is a flowchart depicting exemplary operations that may be executed in certain embodiments of the disclosed system.
Figure 4:
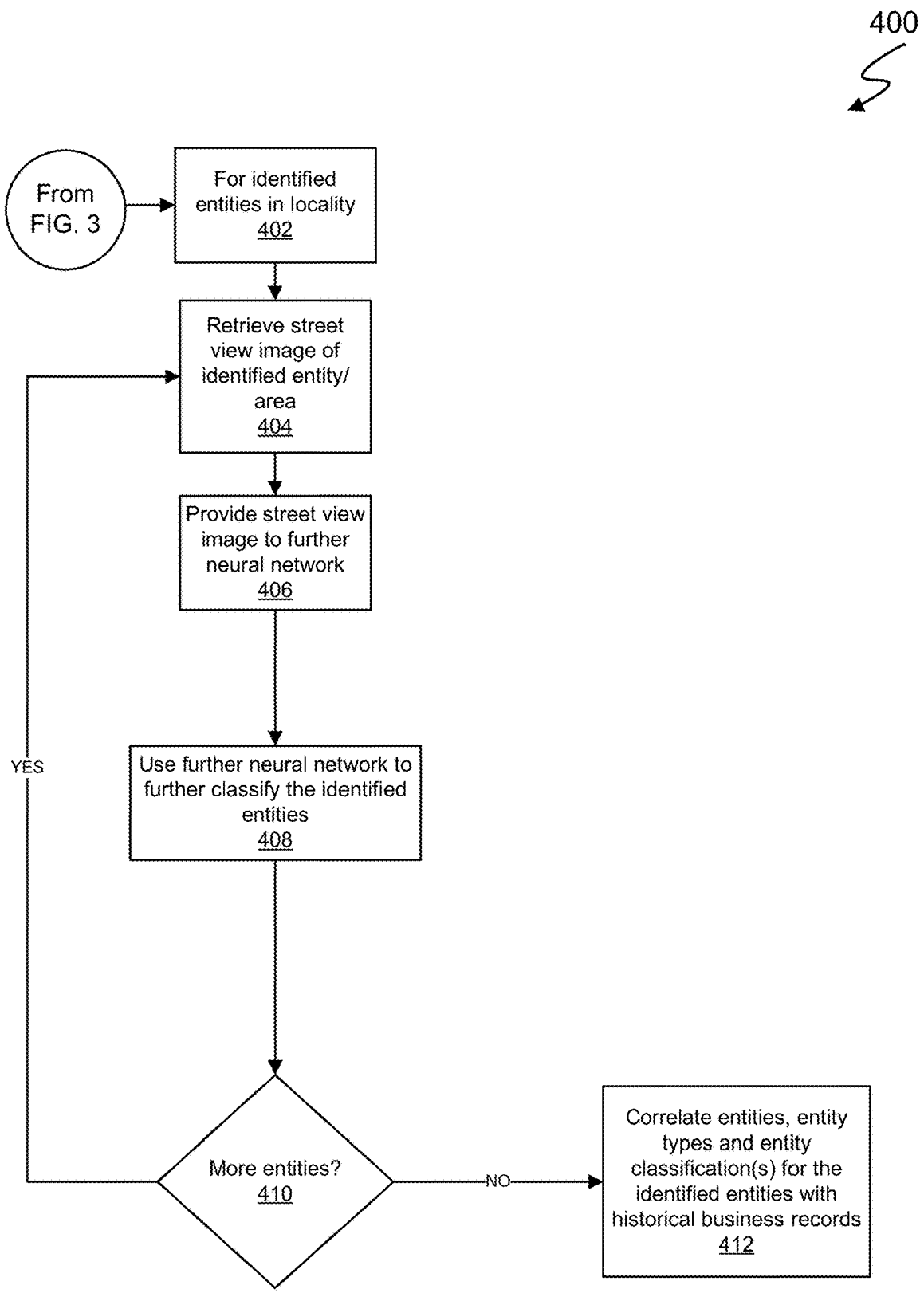
FIG. 4 is a flowchart depicting exemplary operations that may be executed in certain embodiments of the disclosed system.

FIG. 3 is a flowchart 300 and FIG. 4 is a flowchart 400 depicting exemplary operations that may be executed in certain embodiments of the disclosed system. With reference to flowchart 300, a map image for the locality that is to be analyzed is accessed at operation 302. At least one embodiment, the map image is provided to a CNN at operation 304 to separate textual/icon portions of the map image from non-textual/non-icon portions of the map image. In at least one embodiment, the CNN reconstructs the map image at operation 306 using the textual and/icon portions of the map image.

Beginning at operation 308, detected entities in the reconstructed map image are assigned an entity type (e.g., school, theater, retailer, service center, office complex, etc.). To this end, certain embodiments determine at operation 310 whether the entity type is directly derivable from the text associated with the entity or an icon proximate the text for the entity in the reconstructed map image. If the entity type is directly derivable, the entity is assigned the derived entity type at operation 312, and a check is made at operation 314 as to whether or not there are more entities for which an entity type is to be assigned.

If the entity type cannot be directly derived from the text and/or icon information for the entity at operation 310, ancillary directory information may be accessed for the entity at operation 316. In one example, text associated with the detected entity is extracted using, for example, an OCR technique. The OCR text (e.g., "Phoenix") is then used to search the ancillary directory information to provide a more specific name or description of the entity (e.g., "Phoenix Multiplex Theater"). Using the ancillary directory information, the detected entity "Phoenix" in this example is assigned an entity type of "theater" or "multiplex theater."

After an entity has been assigned an entity type at either operation 312 or operation 316, a check is made at operation 314 to determine whether there are more detected entities that are in need of an entity type assignment. If so, the entity type assignment operations are executed with the next entity starting at operation 318.

Embodiments of the disclosed system assign locality profile scores to a locality based on the types of entities found in the locality. In one example, all entities with similar entity types are clustered at operation 320. As an example, entities having an entity type of "school," "University," "college," etc. may be clustered as "education" entities. As a further example, entities having an entity type of "cinema," "movie," "movie house," etc., may be clustered as "movie theater" entities. As a further example, entities having an entity type of "boarding-house," "court," "lodging," etc., may be clustered as "hotel" entities. At operation 322, a locality profile score is assigned to the locality based on the clustered entities. In at least one embodiment, the locality profile score corresponds to the percentage that an entity type contributes to the overall entity makeup of the locality.

FIG. 4 is a flowchart 400 of additional operations that may be executed in certain embodiments of the disclosed system to provide further classifications for the identified entities. In this example, for each of the entities identified in the locality at operation 402, a street view image of the identified entity and/or area proximate the entities retrieved at operation 404. Street view images for an entity may be obtained in a number of different manners from different sources. In at least one embodiment, the text identifying the entity is used to generate a query that is used to retrieve images from, for example, as Google's Street View database. In certain embodiments, the text identifying the entity may be used to generate an Internet search to access the website of the entity having entity images. Based on the teachings of the present disclosure, other means of accessing entity images from public and/or private data stores may be employed.

In certain embodiments, the street view image retrieved at operation 404 is provided to the input of a CNN at operation 406. At operation 408, certain embodiments of the CNN further classify the identified entities using the corresponding street view images. In one example, the CNN may assign further classifications to a school entity based on the appearance of the entity in the school image. Certain characteristics of the image may be used to classify the size of the school, the likely income demographics of the school, whether the school facility is likely to have a sports program, etc. In another example, the CNN may classify a hotel entity based on, for example, the size of the hotel entity, the likely income demographic of the hotel entity, whether the hotel entity is a luxury hotel, etc. In at least one embodiment, the image for the entity is presented to a CNN that has been trained on the same type of entity. As an example, the image of a school entity will be provided to a CNN that has been trained to classify school entities. Similarly, the image of a hotel entity will be provided to a CNN that has been trained to classify hotel entities. As will be recognized from the teachings of the present disclosure, the classifications provided by the CNN are the subject of design choice and may be selected to represent further entity classifications that are useful for various tactical and strategic business goals.

Once a further classification, if any, is assigned to an entity at operation 408, a check is made at operation 410 to determine whether any more entities are to be further classified using the street view image of the entity. If more entities are to be subject to further classification, certain embodiments continue to implement operations 404, 406, and 408 until such here are no more entities that are subject to further classification. Entities that have been assigned an entity type and classified within the locality may be correlated with historical records at operation 412 for use in subsequent business analytics applications.

Figure 5:
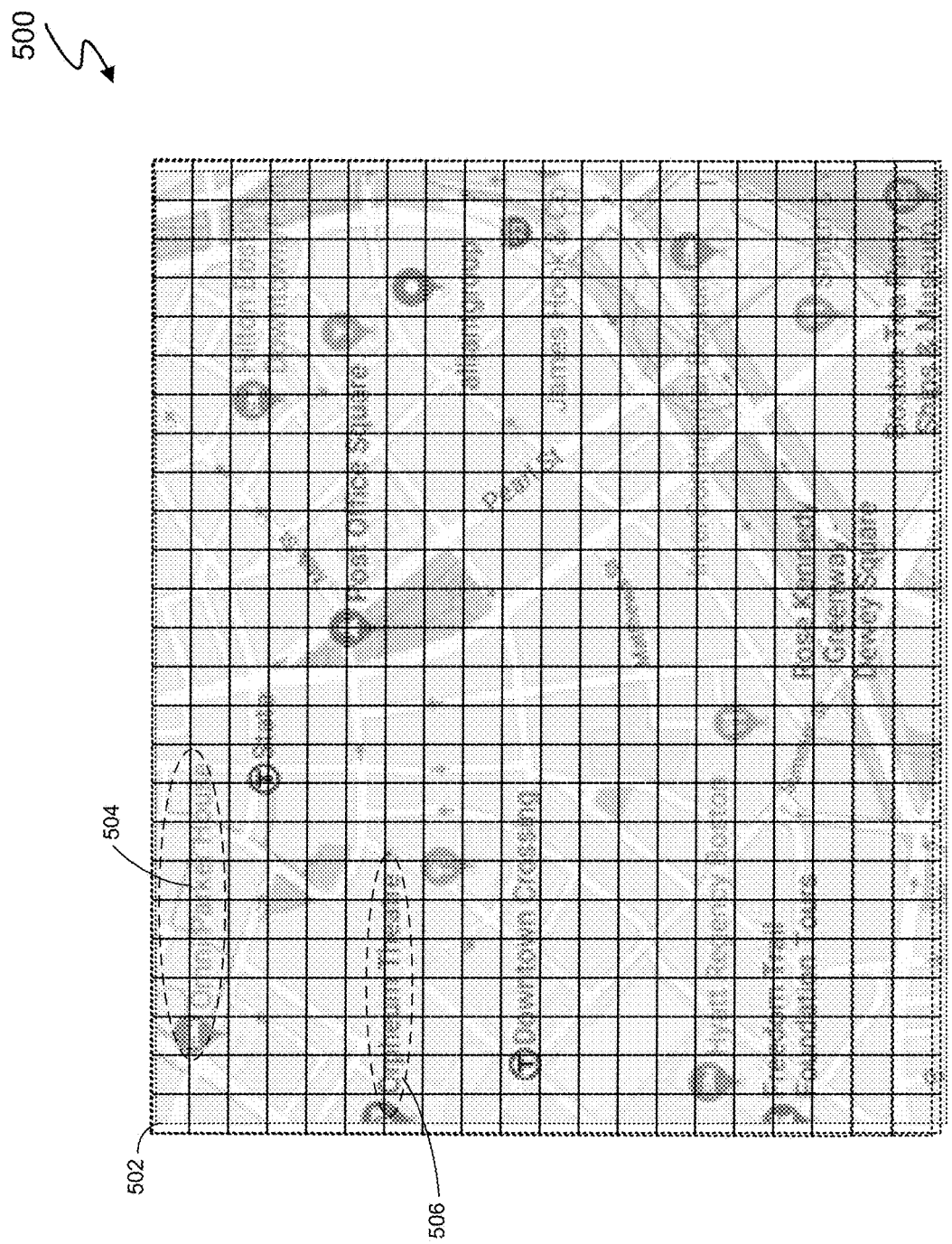
FIG. 5 shows an exemplary map image of a locality that may be analyzed using certain embodiments of the disclosed system.

FIG. 5 shows an exemplary map image 500 of a locality that may be analyzed using certain embodiments of the disclosed system. The specific example shown in FIG. 5 is a map image of an area of downtown Boston, Mass. Map image 500 includes regions of segmented pixel areas 502 that form text images and icon images. In this example, the map image 500 includes a region 504 of segmented pixel areas 502 containing an image representing the text "Omni Parker House." Another portion of the map image 500 includes a region 506 of segmented pixel areas 502 containing an image representing the text "Orpheum Theater." Other regions of the map image include segmented pixel areas corresponding to images of other text and/or icons.

Figure 6:
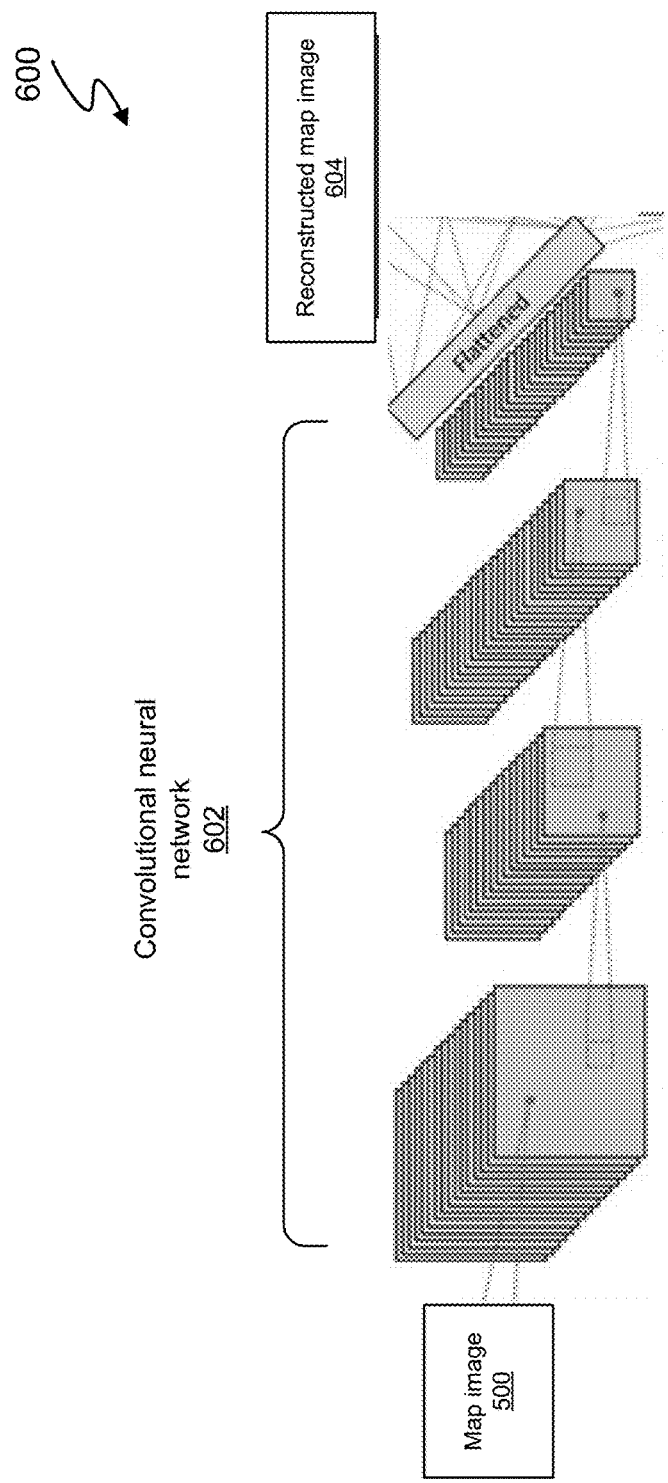
FIG. 6 shows a neural network environment that may be used in certain embodiments of the disclosed system.

FIG. 6 shows a neural network environment 600 that may be used in certain embodiments of the disclosed system. In this example, the map image 500 is provided to the input of a convolutional neural network 602. The convolutional neural network 602 is trained to extract regions of segmented pixel areas of the map image 500 representing text and/or icons. In FIG. 6, the convolutional neural network reconstructs the map image using the text and/or icon pixel regions and presents the reconstructed map image 604 at the output of the convolution neural network 602.

Figure 7:
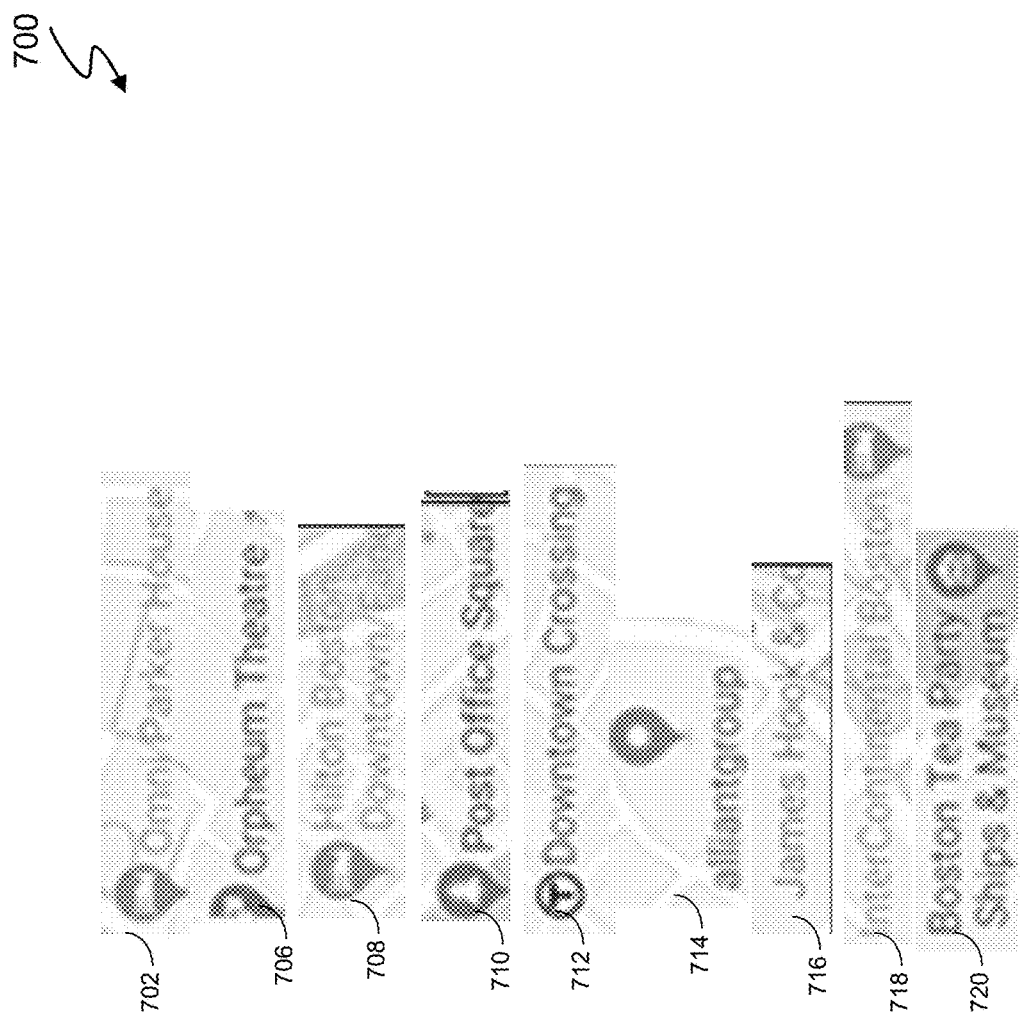
FIG. 7 shows one example of a reconstructed map image.

FIG. 7 shows one example of a reconstructed map image 700. As shown in this example, the convolutional neural network 602 has extracted regions of the map image 500 having text and/or icons and aggregated the regions in a manner that allows for subsequent entity identification operations. For example, the pixel segments of region 504 of FIG. 5 have been reconstructed by the convolutional neural network 602 as region 702 in the reconstructed map image 700. The pixel segments of region 506 of FIG. 5 have been reconstructed by the convolutional neural network 602 as region 706 in the reconstructed map image 700. FIG. 7 also shows regions 708-720 that have been reconstructed from map image 500 by the convolutional neural network 602.

Figure 8:
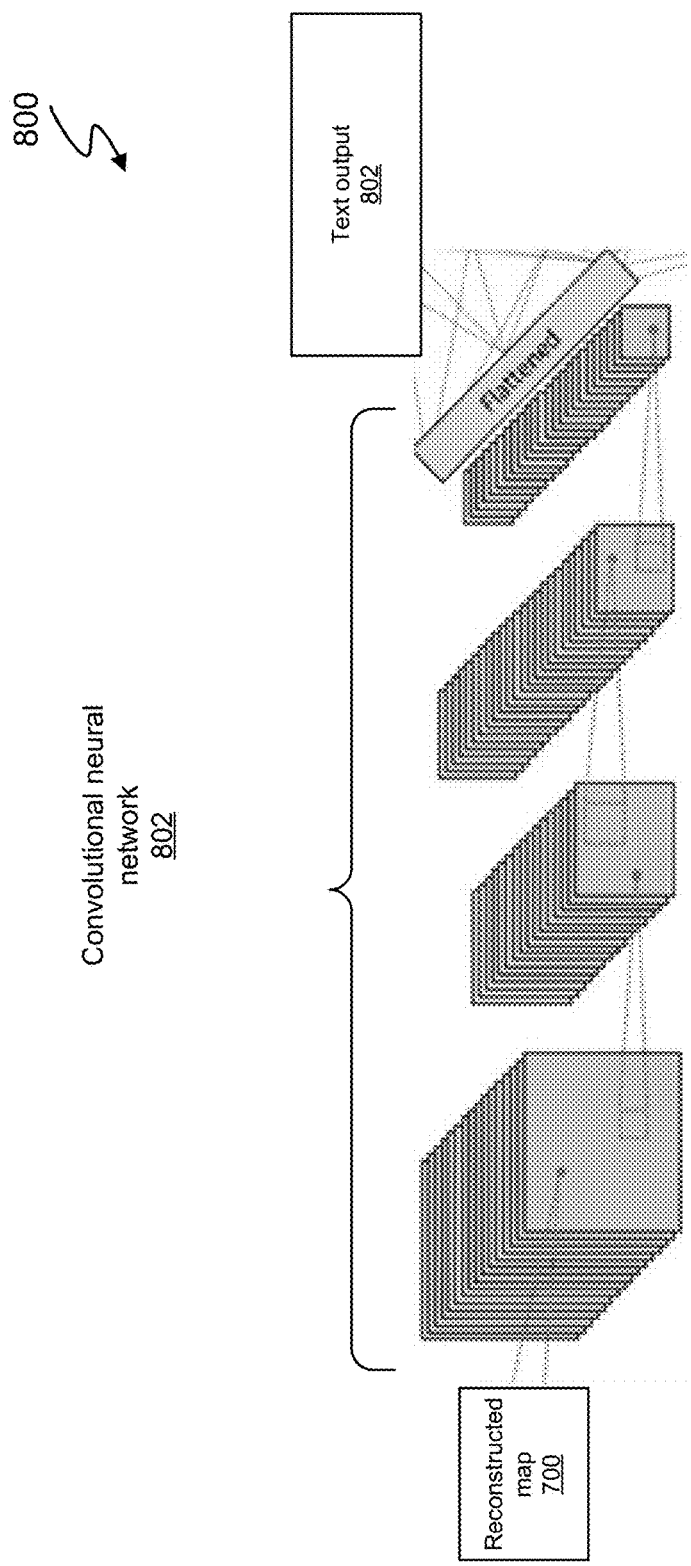
FIG. 8 shows a neural network environment that may be used in certain embodiments of the disclosed system.

FIG. 8 shows a neural network environment 800 that may be used in certain embodiments of the disclosed system. In this example, the reconstructed map image 700 is provided to the input of a convolutional neural network 802. In certain embodiments, the convolutional neural network conducts an OCR operation on the reconstructed map image 700 to identify entities present in the reconstructed map image 700. In at least one embodiment, the convolutional neural network 802 provides a text output 804 including text corresponding to the names of entities found in the reconstructed map image 700. In at least one embodiment, the text output 804 includes a textual identification of an entity type for an entity name based on an icon that is detected in a vicinity proximate the entity name in the reconstructed map image. For example, without limitation, the text output for region 702 of the reconstructed map image 700 is "Omni Parker House." However, the "Omni Parker House" entity is associated with a hotel icon in region 702. Accordingly, some embodiments may associate the text "hotel" (or other appropriate entity type classification) in the text output 804 with the entity name "Omni Parker House."

In certain embodiments, names for the entities detected in the reconstructed map image 700 are associated with a corresponding entity type (see, for example, FIG. 3). Localities may be scored based on the entity types found in the localities.

In certain embodiments, map reconstruction operations and text recognition operations may be executed using a single convolutional neural network. In such embodiments, convolutional neural network 602 and convolutional neural network 802 may be consolidated as a single convolutional neural network that extracts textual and/or icon regions of a map image for a locality, reconstructs a map image using the extracted textual and/or icon regions of the map image and detects text associated with entities in the locality.

Figure 9:
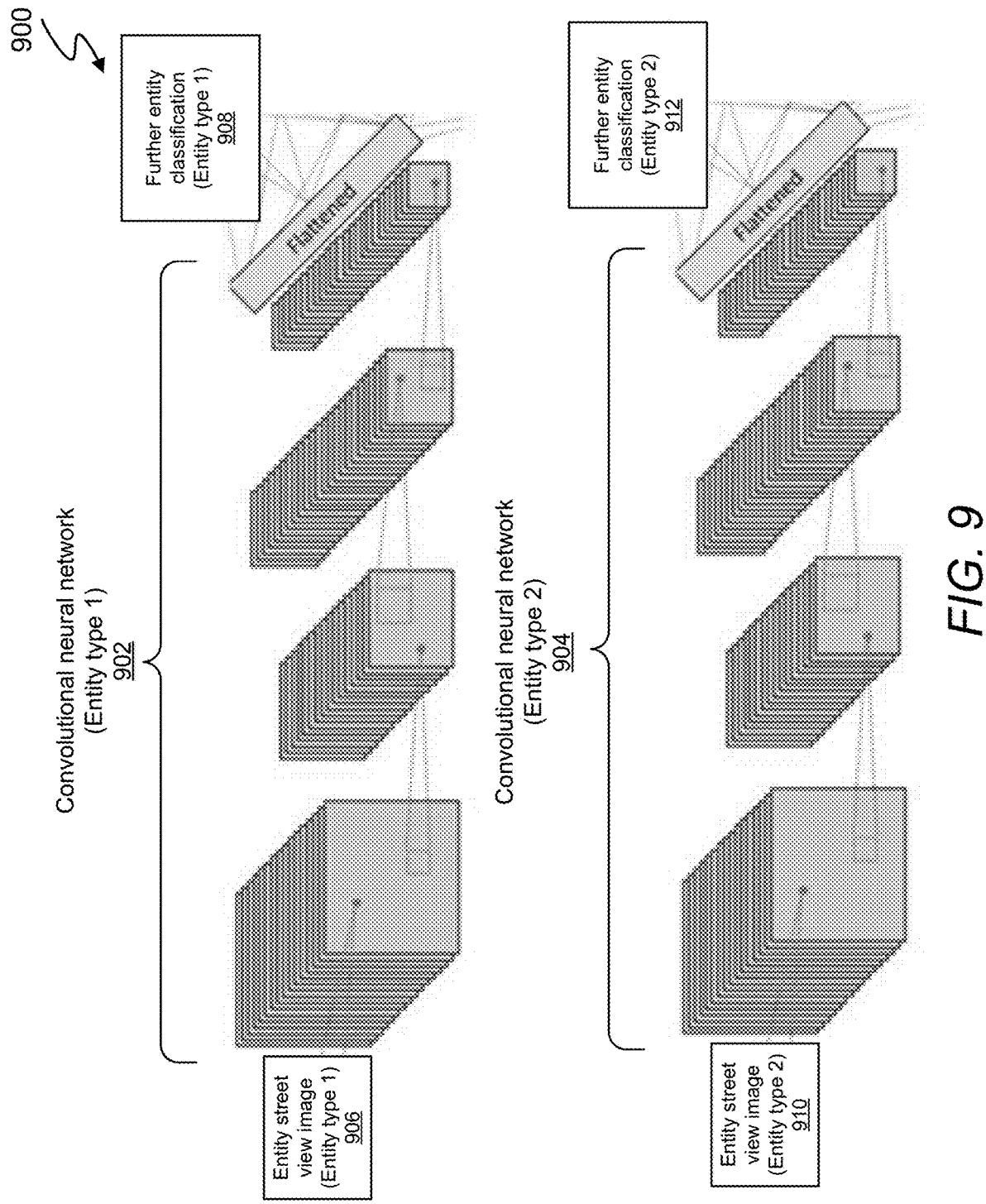
FIG. 9 shows a neural network environment that may be used in certain embodiments of the disclosed system.

FIG. 9 shows a neural network environment 900 that may be used in certain embodiments of the disclosed system. The neural network environment 900 includes convolutional neural network 902 and convolutional neural network 904 that are configured to assign further classifications to entities based on a street view images of the entities. In certain embodiments, convolutional neural network 902 has been trained to classify entities of a first type (Entity type 1, such as educational entities), while convolutional neural network 904 has been trained to classify entities of a second type (Entity type 2, such as retail entities). In at least one embodiment, street view images 906 of entities of entity type 1 are provided to the input of the convolutional neural network 902, which provides a further entity classification for type 1 entities at output 908. In at least one embodiment, street view images 910 of entities of entity type 2 are provided to the input of the convolutional neural network 904, which provides a further entity classification for the type 2 entities at output 912. Although separate convolutional neural networks are used to classify different entity types, some embodiments may employ individual convolutional neural networks that have been trained and configured to operate on images of multiple entity types.

Figure 10:
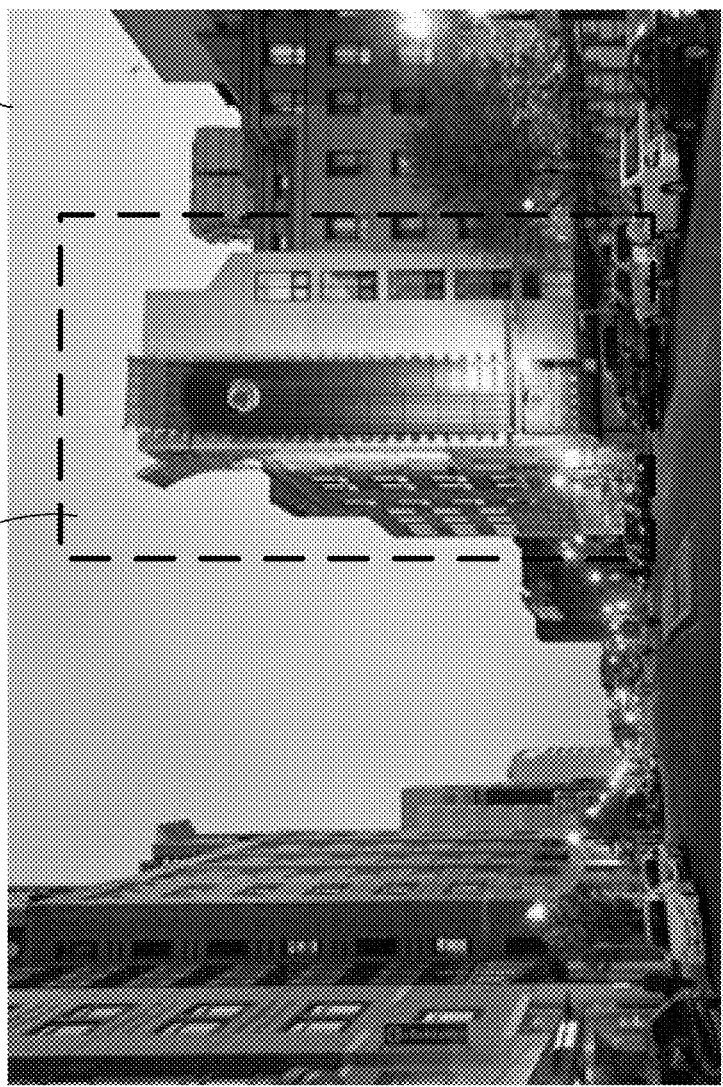
FIG. 10 is an illustration of an economic classification that has been assigned to an entity based on the street view image of the entity and/or area proximate the entity.

FIG. 10 is an illustration 1000 of a further classification that has been assigned to an entity based on the street view image 1002 of the entity. In this example, street view image 1002 includes an image region 1004 of a hotel entity that is to be classified using a convolutional neural network that has been trained using, for example, hotel images and/or images associated with the dominant entity type and the locality. One example of classifications that may be assigned to the entity in image region 1004 as shown in table 1006. Here, the type of building is classified as a "Hotel," the nature of the hotel is "Luxury," and the entity is in a locality that has been generally identified as "Downtown." Further, the locality in which the hotel is located has been classified as a high economic classification, meaning that the locality may be associated with significant income and/or entity spending on products or services.

Figure 11:
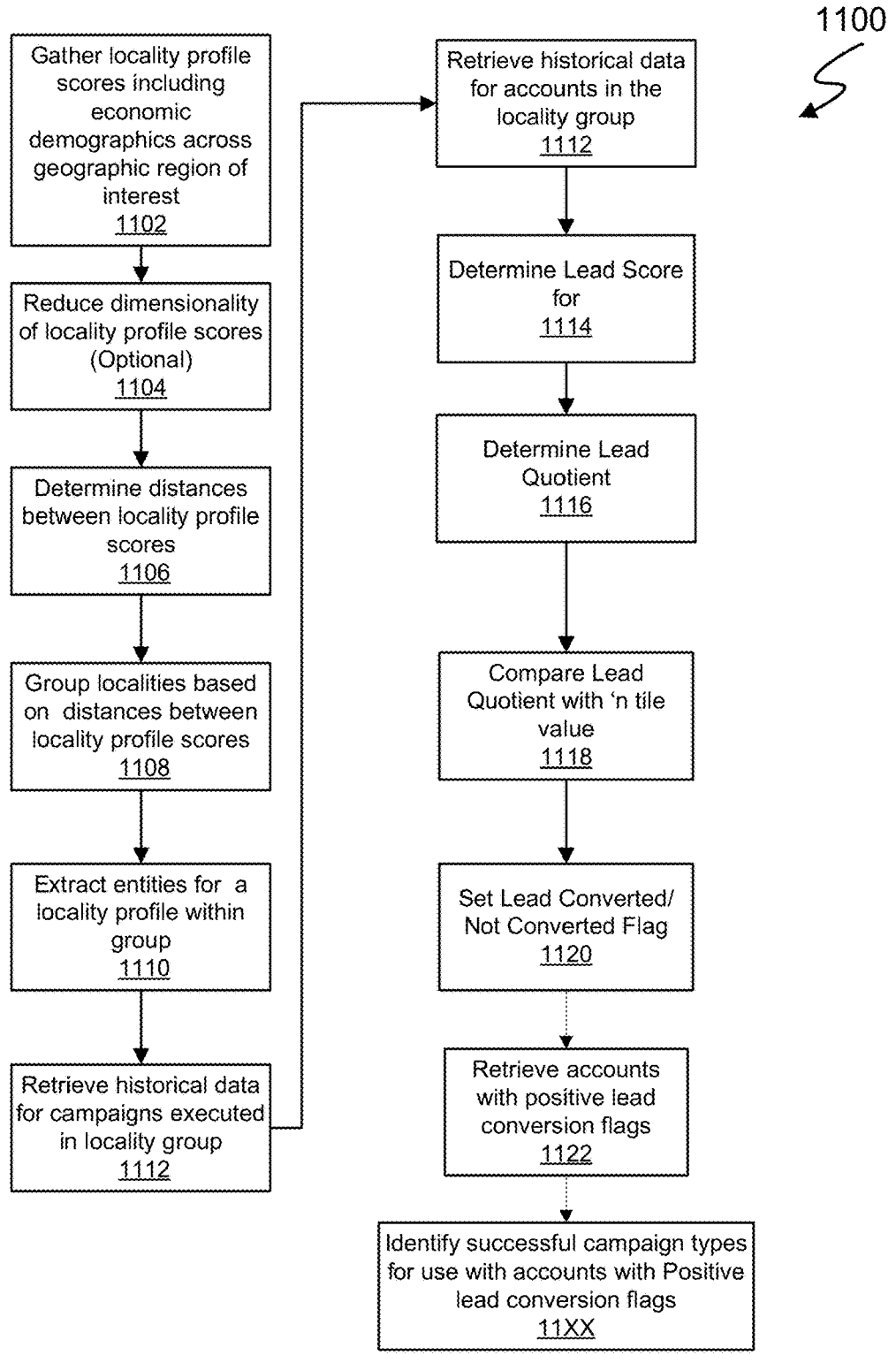
FIG. 11 is a flowchart showing exemplary operations that may be executed in certain embodiments of the disclosed system.

FIG. 11 is a flowchart 1100 showing exemplary operations that may be executed in certain embodiments of the disclosed system. In this example, locality profile scores and economic classifications are gathered for localities across one or more geographic regions of interest at operation 1102. As described herein, the locality profile scores are spread across entity types and the economic classification may be expressed as a general economic classification (e.g., high/medium/low) or a numeric score. In certain embodiments, the entity types and economic classifications represent the dimensions used in determining a distance metric used to group localities having similar characteristics. In certain embodiments, the locality profile scores include a significant number of entity types and, as such, have a significant number of dimensions. In such instances, the dimensionality of the locality profile scores and, optionally, economic classifications may be reduced at operation 1104 using, for example, a Principal Component Analysis technique, to provide a locality profile score having fewer dimensions.

At operation 1106, certain embodiments determine the statistical distances between locality profile scores and, optionally, economic classifications for the localities across the geographic regions of interest to, for example, identify localities having common characteristics. In certain embodiments, the distance metrics are based on the profile dimensions in the base locality profile scores. In certain embodiments, the distance metrics are based on profile metrics using dimensionally reduced locality profile scores. In certain embodiments, the distance metrics may include the economic classifications of the localities. Certain embodiments may employ statistical difference measurements to determine the distance metrics. Although other statistical difference measurements may be used, exemplary statistical difference measurements may include a Euclidean distance metric and/or Manhattan distance metric. For example, a distance metric between two locality profile scores LP1 and LP2 each having three locality score dimensions (x, y, z) may be determined in the following manner:

$$\text{Distance} = \text{sqrt}((LP1_x - LP2_x)^2 + (LP1_y - LP2_y)^2 + (LP1_z - LP2_z)^2).$$

In at least one embodiment, the distance metric between each locality profile score (and, if desired, economic classifications) is compared with every other locality profile score (and, if desired, economic classifications) for the localities across the geographic region of interest is determined. In the example of FIG. 11, localities are grouped based on the distances between the locality profile scores and economic classifications. In at least one embodiment, localities having locality profile scores and economic classifications less than a predetermined metric distance are grouped with one another. In at least one embodiment, historical campaign data is extracted for each locality profile within a locality profile group 1110. As an example, the historical data for campaigns may include information such as:

Event (e1: Webinar): Hosted in: Locality 1; Leads Generated: x1; ROI=x %

Event (e2: Seminar): Hosted in: Locality 2; Leads Generated: x2; ROI=y %

Event (e3: CIO Connect): Hosted in: Locality 3; Leads Generated: x3;

ROI==z %

At operation 1112, certain embodiments retrieve account information for entities in the locality group. The account information may include data such as entity spending on products/services of the enterprise, the number of employees of the entity, and the locality in which the entity resides. The locality in which the entity resides is used to retrieve the locality score and any locality economic classification data for the entity.

In certain embodiments, the historical campaign data is integrated with locality profile scores, locality economic characteristics, and entity account information to generate a lead score at operation 1114 for each entity based on a specific campaign type. In certain embodiments, the lead score for an entity may be determined by applying locality scores for the account, historical data for the account, firmographic information, etc. to the input of a trained neural network. As an example, the factors used in determining the lead score may include, but are not limited to, variables such as:

Lead Score=f (No. of Entity Employees, Spending on products and/or services with the enterprise, Campaign Vehicle (e1, e2, e3), locality profile score, economic classification of the entity and/or locality, dominant entity type in locality)

In certain embodiments, the lead score corresponds to a certain probability that a lead will be converted for the entity for a particular campaign.

In certain embodiments, the lead score may be combined with historical return on investment for a particular campaign vehicle to determine a lead quotient at operation 1116. In certain embodiments, the lead quotient is determined by after running the predictive model to determine if a certain account is going to be converted against a certain campaign. In certain embodiments, the lead quotient is a product of the lead score and the historical return on investment for a particular campaign vehicle.

At operation 1118, the lead quotient may be compared against a predetermined threshold, which may be either subjectively or objectively selected. It is assumed that a lead on the account will be converted to the sale of a product/service if the comparison shows that the lead quotient meets the predetermined threshold. If the lead quotient does not meet the predetermined threshold, it is assumed that a lead will not be converted. In certain embodiments, the predetermined threshold is based on the n'tile lead quotient, which compares the lead quotient values for the account of interest account across multiple campaigns and takes the values of the top n'tile campaigns for targeting.

A binary lead converted/not converted flag may be set at operation 1120 based on the comparison at operation 1118. The flag may be stored and associated with the account of the entity. Accounts with positive lead conversion flags may be retrieved at operation 1122 in order to identify successful campaign types used with similar entities.

Figure 12:
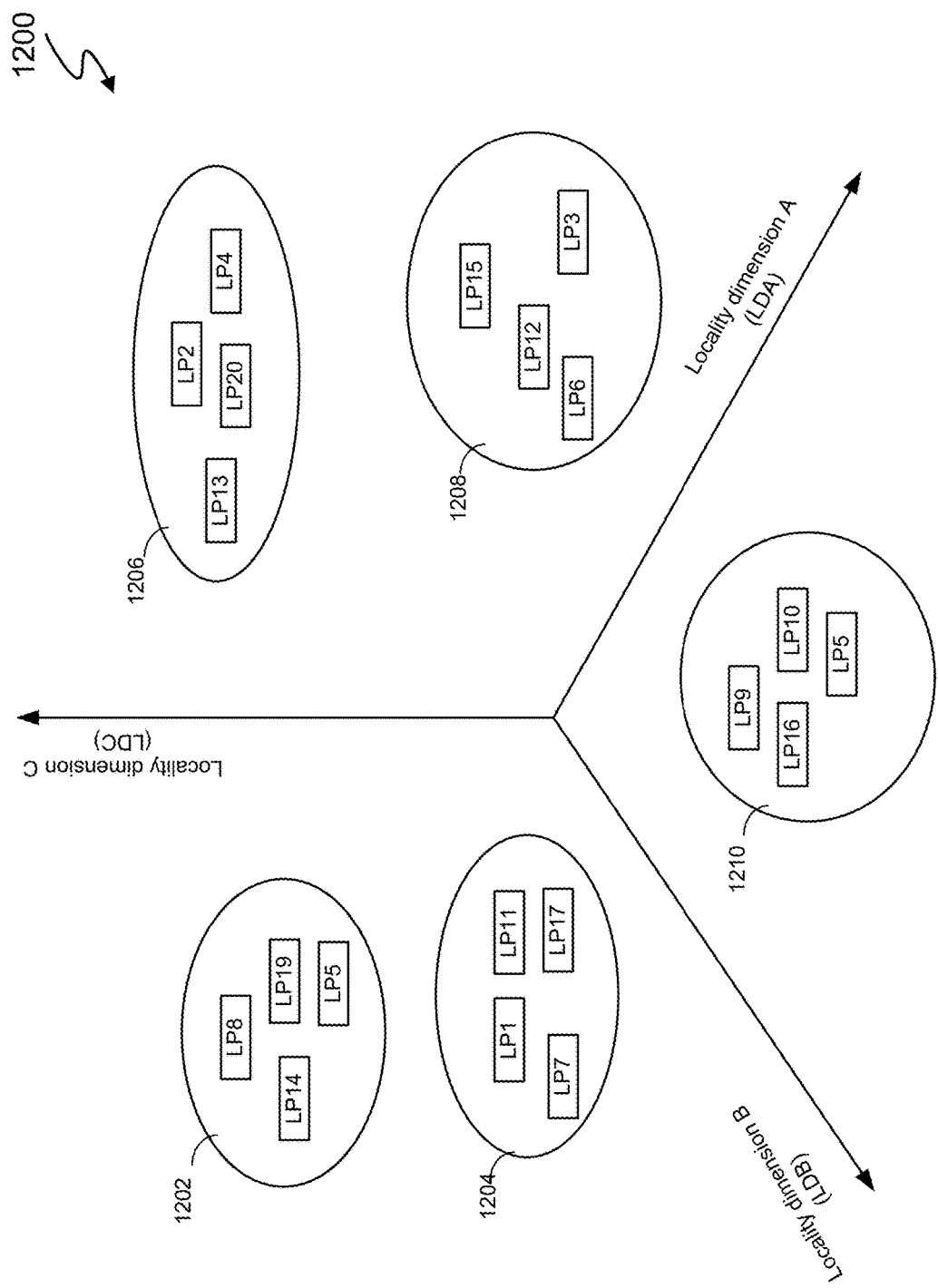
FIG. 12 is a plot showing an exemplary distribution and grouping of localities based on the locality profile scores of the locality.

FIG. 12 is a plot 1200 showing an exemplary distribution and grouping of localities based on the locality profile scores of the locality and economic classifications. In this example, the locality profile scores have been reduced to three locality dimensions LDA, LDB, and LDC. Locality profile scores for each locality in this example have been plotted using the locality dimensions along the LDA, LDB, and LDC axes. The locality dimensions for a locality profile score of a locality are used to determine distance metrics between the locality profile scores. Locality profile scores of multiple localities are grouped in a common grouping if the distances between the locality profile scores are less than a predetermined value. In the example shown in FIG. 12, there are five locality profile groupings 1202, 1204, 1206, 1208, and 1210, each profile grouping corresponding to a set of localities having common locality profiles. Here, grouping 1202 includes locality profiles LP5, LP8, LP14, and LP19, each associated with a locality and corresponding entities within the locality. Grouping 1204 includes locality profiles LP1, LP7, LP11, and LP17, each associated with a locality and corresponding entities within the locality. Grouping 1206 includes locality profiles LP2, LP4, LP13, and LP20, each associated with a locality and corresponding entities within the locality. Grouping 1208 includes locality profiles LP3, LP6, LP12, and LP15, each associated with a locality and corresponding entities within the locality. Grouping 1210 includes locality profiles LP5, LP9, LP10, and LP16, each associated with a locality and corresponding entities within the locality. It will be recognized based on the teachings of the present disclosure that the groupings and number of locality profiles will vary depending on the underlying data, the foregoing being merely non-limiting examples.

FIG. 13 is a table 1300 showing one example of a comparison between two entities having accounts, Account 1 and Account 2, where each account is analyzed to determine whether a given campaign vehicle is likely to be effective in generating leads that may be converted. In this example, the locality scores and economic classification for the entities are shown at 1302. In this example, Account 1 and Account 2 have similar locality scores and economic classifications and, as such, can be expected to have similar conversion of leads for a given campaign vehicle.

Historical information relating to specific campaigns is shown at 1304. In this example, the information at 1304 includes, but is not limited to, an identification of the specific localities in which a campaign vehicle was deployed, the type of campaign vehicle, the number of leads generated in the locality by the campaign vehicle, the conversion rate of the leads in the locality, and return on investment of the campaign.

Exemplary firmographic data for the entity associated with each account is shown at 1306. In this example, the firmographic data includes, but is not limited to, the number of employees of the entity and the amount spent by the entity for goods and/or services offered by the enterprise.

At least portions of the exemplary information shown at 1302, 1304, and 1306 are applied to a neural network to generate the lead score and lead quotient shown at number 1308. The n'tile threshold and binary lead converted/not converted data for each account is shown at 1310.

With respect to Account A of FIG. 13, the exemplary lead score and historical return on investment for an "event" type campaign are $30,000 and 18, respectively. The lead quotient for this example is $540,000, which is less than the 'n tile lead quotient value of 870,000 resulting in a flag of 0 (e.g., negative result) for the lead converted/not converted indicator. As such, an event campaign will not likely be effective to obtain and convert leads associated with Account 1.

With respect to Account 2 of FIG. 13, the exemplary lead score and historical return on investment for an "electronic marketing" type campaign are $150,000 and twenty-four, respectively. The lead quotient for Account 2 in this example is $1,200,000, which is greater than the 'n tile lead quotient value of 1,167,000 resulting in a flag of 1 (e.g., positive result) for the lead converted/not converted indicator. As such, an electronic marketing campaign is likely to be effective at obtaining and converting leads associated with Account 2.

The operations of the disclosed system may be extended to select campaigns that will be effective with greenfield accounts. For example, a locality group may include entities having established accounts and greenfield accounts (potential customers that do not have an established account with the enterprise). Successful campaign vehicles may be identified using the lead scores and lead quotients of the established accounts in a locality profile group. In certain embodiments, it is assumed that successful campaign vehicles associated with the established accounts will likely be successful to obtain and convert leads for greenfield accounts in the locality profile group. In certain embodiments, firmographic information for greenfield accounts may be obtained from third-party sources, such as Hoovers, Google Business, etc., and used to supplement information that would otherwise be missing from the greenfield account data. The supplemental information may be used to provide a more accurate value for a lead score and lead quotient of the greenfield account.

FIG. 14 depicts a table 1400 showing a comparison of the likelihood of effectiveness of two different campaign vehicles, Campaign 1 and Campaign 2, on a single entity, Account 1. In this example, a webinar campaign vehicle is effective for obtaining and converting leads for Account 1 while an electronic marketing vehicle is not particularly effective for obtaining and converting leads for Account 1. The relative effectiveness and ineffectiveness of the webinar and electronic marketing campaign vehicles are expressed in the lead score, lead quotient, n' tile lead quotient, and lead converted/not converted data shown at 1402.

Figure 15:
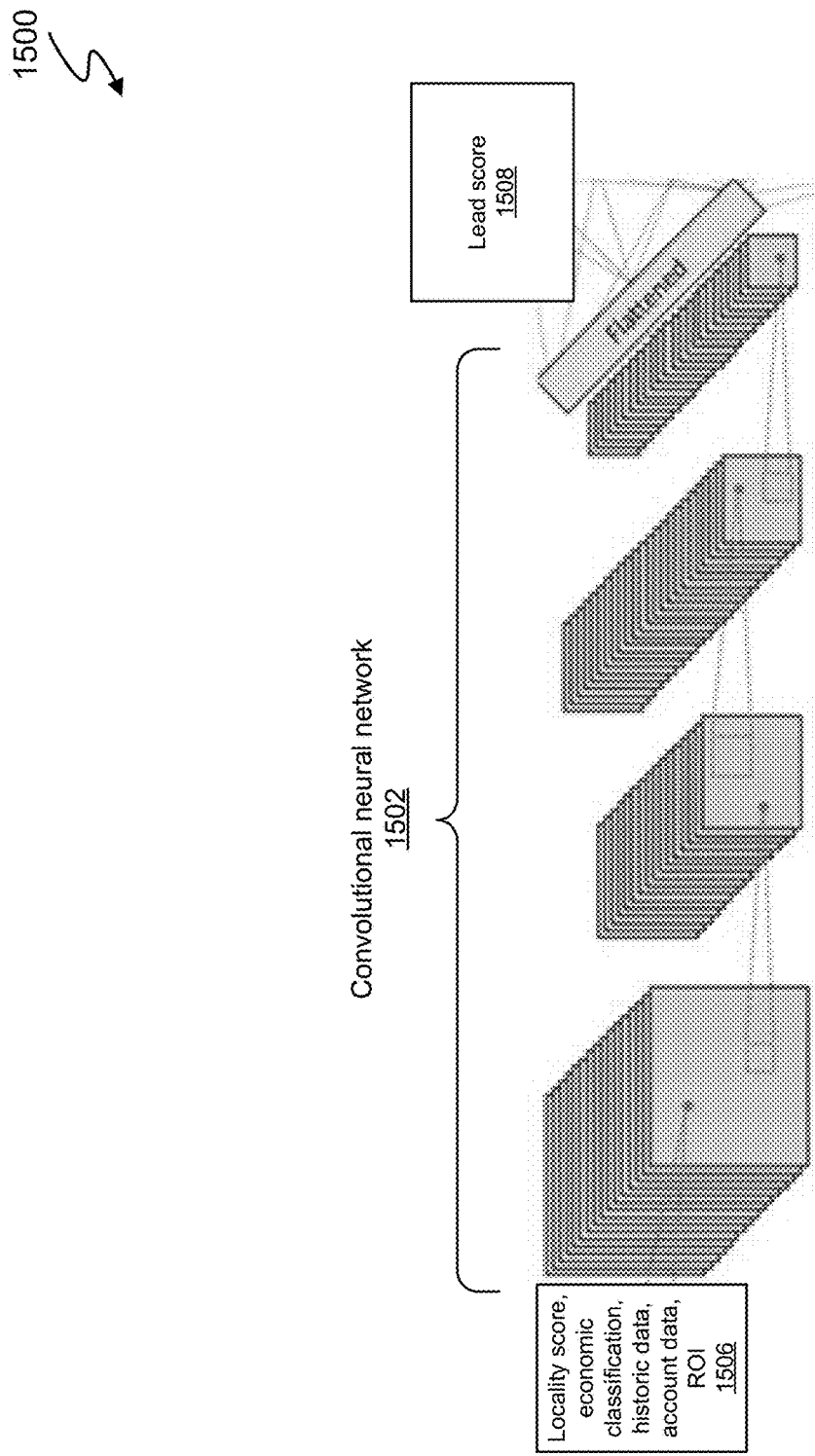
FIG. 15 shows one example of a neural network environment that may be employed in certain embodiments of the disclosed system.

FIG. 15 shows one example of a neural network environment 1500 that may be employed in certain embodiments of the disclosed system. In this example, the environment 1500 includes a convolutional neural network 1502. In certain embodiments, the convolutional neural network 1502 receives the locality score, economic classification, historical campaign data, account data, campaign vehicle, etc., at input 1506. The convolutional neural network 1502 executes deep learning operations on the input data 1506 to provide the lead score at output 1508.

Embodiments of the disclosure are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

What is claimed is:

1. A computer-implemented method for using machine vision to categorize a locality to conduct lead mining analyses, the method comprising:

generating locality profile scores and economic categorizations for each locality of a plurality of localities, wherein the locality profile score includes percentage distributions of entity classes within the locality, the locality profile score for each locality being derived through neural network analyses of map images of the locality, the economic categorization being derived through neural network analyses of images of entities within the locality;

performing the neural network analysis via a convolutional neural network, the convolutional neural network consuming segmented pixel areas and distinguishing between areas containing at least one of text and icons from areas that do not contain at least one of text and icons;

grouping localities having similar locality profile scores;

extracting entities in a locality group;

retrieving historical data for the extracted entities in the locality group, wherein the historical data for the entities in the locality includes campaign vehicles hosted in the locality to promote sales of goods and/or services of an enterprise, leads generated by the campaign vehicles in the locality, and return on investment for the campaign vehicles in the locality;

generating a lead score for each entity in the locality group as a function of the locality profile score for the locality in which the entity is located, economic categorization of the locality in which the entity is located, and campaign vehicles used in the locality in which the entity is located, the lead score for an entity being further based on a number of employees of the entity and spending by the entity on products and/or services offered by the enterprise;

accessing a map image of a locality, wherein the map image includes geographical artefacts corresponding to entities within the locality;

analyzing the map image to detect the entities in the locality using the geographical artefacts;

assigning entity classes to detected entities in the locality, the assigning entity classes including assigning the detected entities on one of a first type and a second type, the neural network analysis being performed for each of the first type and the second type, respectively; and assigning the locality profile score to the locality based on entity classes included in the locality; and, generating a lead score for a green field entity using information obtained from a third-party resource.

2. The computer-implemented method of claim 1, further comprising:

generating a lead quotient for the entity, wherein the lead quotient is a function of the historical return on investment of campaigns within the locality and the lead score.

3. The computer-implemented method of claim 2, further comprising:

comparing the lead quotient with an n' tile threshold value; and setting a lead converted/not converted flag for the entity when the lead quotient does not reach the n' tile threshold value.

4. The computer-implemented method of claim 1, wherein grouping localities having similar locality profile scores comprises:

determining a statistical distance metric between locality profile scores of the plurality of localities; and grouping localities having a statistical distance metric below a predetermined threshold.

5. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

generating locality profile scores and economic categorizations for each locality of a plurality of localities, wherein the locality profile score includes percentage distributions of entity classes within the locality, the locality profile score for each locality being derived through neural network analyses of map images of the locality, the economic categorization being derived through neural network analyses of images of entities within the locality, the neural network analysis being performed via a convolutional neural network, the convolutional neural network consuming segmented pixel areas and distinguishing between areas containing at least one of text and icons from areas that do not contain at least one of text and icons;

performing the neural network analysis via a convolutional neural network, the convolutional neural network consuming segmented pixel areas and distinguishing between areas containing at least one of text and icons from areas that do not contain at least one of text and icons; grouping localities having similar locality profile scores;

extracting entities in a locality group;

retrieving historical data for the extracted entities in the locality group, wherein the historical data for the entities in the locality includes campaign vehicles hosted in the locality to promote sales of goods and/or services of an enterprise, leads generated by the campaign vehicles in the locality, and return on investment for the campaign vehicles in the locality;

generating a lead score for each entity in the locality group as a function of the locality profile score for the locality in which the entity is located, economic categorization of the locality in which the entity is located, and campaign vehicles used in the locality in which the entity is located, the lead score for an entity being further based on a number of employees of the entity and spending by the entity on products and/or services offered by the enterprise;

accessing a map image of a locality, wherein the map image includes geographical artefacts corresponding to entities within the locality;

analyzing the map image to detect the entities in the locality using the geographical artefacts;

assigning entity classes to detected entities in the locality, the assigning entity classes including assigning the detected entities on one of a first type and a second type, the neural network analysis being performed for each of the first type and the second type, respectively; and assigning the locality profile score to the locality based on entity classes included in the locality; and, generating a lead score for a green field entity using information obtained from a third-party resource.

6. The system of claim 5, further comprising generating a lead quotient for the entity, wherein the lead quotient is a function of the historical return on investment of campaigns within the locality and the lead score.

7. The system of claim 6, further comprising:
comparing the lead quotient with an n' tile threshold value; and
setting a lead converted/not converted flag for the entity when the lead quotient does not reach the n' tile threshold value.

8. The system of claim 5, wherein grouping localities having similar locality profile scores comprises:
determining a statistical distance metric between locality profile scores of the plurality of localities; and
grouping localities having a statistical distance metric below a predetermined threshold.

9. The system of claim 5, further comprising:
accessing a map image of a locality, wherein the map image includes geographical artefacts corresponding to entities within the locality;
analyzing the map image to detect the entities in the locality using the geographical artefacts;
assigning entity classes to detected entities in the locality; and
assigning the locality profile score to the locality based on entity classes included in the locality.

10. A non-transitory, computer-readable storage medium embodying computer program code, the computer program code comprising computer executable instructions configured for:
generating locality profile scores and economic categorizations for each locality of a plurality of localities, wherein the locality profile score includes percentage distributions of entity classes within the locality, the locality profile score for each locality being derived through neural network analyses of map images of the locality, the economic categorization being derived through neural network analyses of images of entities within the locality;
performing the neural network analysis via a convolutional neural network, the convolutional neural network consuming segmented pixel areas and distinguishing between areas containing at least one of text and icons from areas that do not contain at least one of text and icons;
grouping localities having similar locality profile scores;
extracting entities in a locality group;
retrieving historical data for the extracted entities in the locality group, wherein the historical data for the entities in the locality includes campaign vehicles hosted in the locality to promote sales of goods and/or services of an enterprise, leads generated by the campaign vehicles in the locality, and return on investment for the campaign vehicles in the locality;
generating a lead score for each entity in the locality group as a function of the locality profile score for the locality in which the entity is located, economic categorization of the locality in which the entity is located, and campaign vehicles used in the locality in which the entity is located, the lead score for an entity being further based on a number of employees of the entity and spending by the entity on products and/or services offered by the enterprise;
accessing a map image of a locality, wherein the map image includes geographical artefacts corresponding to entities within the locality;
analyzing the map image to detect the entities in the locality using the geographical artefacts; assigning entity classes to detected entities in the locality, the assigning entity classes including assigning the detected entities on one of a first type and a second type, the neural network analysis being performed for each of the first type and the second type, respectively; and
assigning the locality profile score to the locality based on entity classes included in the locality; and,
generating a lead score for a green field entity using information obtained from a third-party resource.

11. The non-transitory, computer-readable storage medium of claim 10, further comprising:
generating a lead quotient for the entity, wherein the lead quotient is a function of the historical return on investment of campaigns within the locality and the lead score.

12. The non-transitory, computer-readable storage medium of claim 11, further comprising:
comparing the lead quotient with an n' tile threshold value; and
setting a lead converted/not converted flag for the entity when the lead quotient does not reach the n' tile threshold value.

13. The non-transitory, computer-readable storage medium of claim 10, wherein grouping localities having similar locality profile scores comprises:
determining a statistical distance metric between locality profile scores of the plurality of localities; and
grouping localities having a statistical distance metric below a predetermined threshold.

14. The non-transitory, computer-readable storage medium of claim 10, further comprising:
accessing a map image of a locality, wherein the map image includes geographical artefacts corresponding to entities within the locality;
analyzing the map image to detect the entities in the locality using the geographical artefacts;
assigning entity classes to detected entities in the locality; and
assigning the locality profile score to the locality based on entity classes included in the locality.

\* \* \* \* \*